Sept. 3, 1968  H. E. RIORDAN ET AL  3,399,572

VIBRATING BEAM PRESSURE TRANSDUCER

Filed Dec. 1, 1966  2 Sheets-Sheet 1

INVENTORS
HUGH E. RIORDAN
LEON WEISBORD

BY Karl A. Ohralik

ATTORNEY

United States Patent Office 3,399,572
Patented Sept. 3, 1968

3,399,572
VIBRATING BEAM PRESSURE TRANSDUCER
Hugh E. Riordan, Wyckoff, N.J., and Leon Weisbord,
New York, N.Y., assignors to General Precision Inc.,
Little Falls, N.J., a corporation of Delaware
Filed Dec. 1, 1966, Ser. No. 598,386
7 Claims. (Cl. 73—398)

ABSTRACT OF THE DISCLOSURE

An apparatus for producing a digital output in accordance with a gas pressure is provided by a pair of closely spaced, conductive plates forming a capacitor. One of the plates is a transversely vibratory beam. The capacitor is disposed in a gaseous medium the pressure of which is to be measured. The frequency of vibration of the one plate, varies, among other factors, according to the pressure and density of the gas. To derive a digital output, the capacitor is placed in the frequency determining circuit of an oscillator whose output is frequency modulated by the plate vibrations. A discriminator circuit removes the carrier frequency producing an output potential varying at the frequency of plate vibration. To maintain vibration of the plate, a part of the output, in proper phase, is superimposed on a direct potential applied across the plates to drive the vibratory plate by electrostatic attraction.

Figure 1:
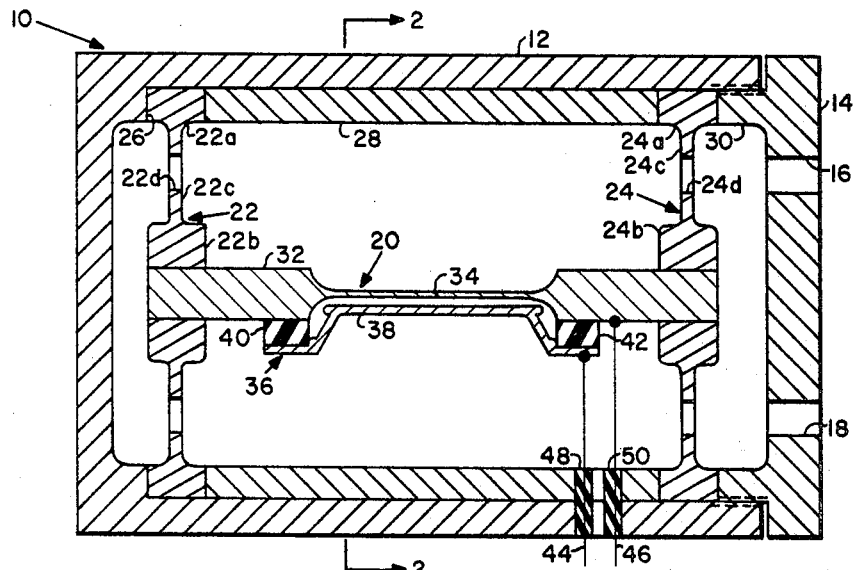

The output thus consists of a sinusoidal voltage having a frequency equal to that of the vibrating beam and hence directly related to the ambient pressure.

---

This invention relates to a pressure transducer capable of producing a digital output potential as a function of a gas pressure.

There are many apparatus for measuring pressure of a gas. Included among such apparatus are manometers, weight load pistons, Bourdon tubes, diaphragm devices, bellows devices, and strain gauge devices. While these apparatus have largely filled some particular needs, they fail to meet certain present-day pressure indicator requirements. Among other drawbacks, these apparatus are analog in nature, producing analog outputs. In cases wherein pressure information is required as an input to a digital computer or other digital data processing apparatus, the outputs from these prior pressure indicating apparatus must be converted from analog to digital form which requires additional apparatus to perform the conversion. The additional cost, size, weight, and complexity of such converters may be serious drawbacks, particularly in airborne applications.

In accordance with the present invention, a pressure transducer is provided which is responsive to gaseous pressure to produce a digitial output representative of the gaseous pressure. A sealed enclosure into which the gas is introduced also contains a vibratory beam which is preferably relatively thin and flat. Co-operative with the beam is a second flat surface substantially coextensive with the surface of the beam and closely spaced from it. Gas within the interior of the enclosure occupies the space between these surfaces. The frequency of vibration of the beam is dependent upon various factors including not only its dimensions and material properties but also on the pressure and density of the gas between these surfaces. This phenomenon is utilized to provide a pressure transducer wherein the output is a potential, the frequency of which varies with the pressure of gas within the enclosure.

In a physical ebodiment of invention, the beam may be made of conductive material such as metal or of a nonconductive material with a conductive surface coating and is supported in a substantially stress-free condition. The complementary surface likewise may be a conductive metal or nonconductive material with a conductive coating whereby the two together form an electrical capacitor. The vibration of the beam is effective to vary the spacing between such surfaces and thus, to vary the capacitance of such capacitor.

To provide an external indication of such pressure, the capacitor so formed is included in the frequency determining circuit of a high frequency oscillator whereby vibrations of the beam are effective to vary the spacing of capacitor plates and therefore also the capacitance of the capacitor and frequency modulate the oscillator. The carrier frequency of the oscillator is removed by a frequency demodulator circuit, producing an output potential varying at the beam vibration rate. Thus, the frequency of the output potential is a digitial indication of the pressure within the enclosure. To maintain vibration of the beam a portion of the output potential is superimposed in the proper phase, on a direct potential applied across the mentioned capacitor plates. Electrostatic forces, thus developed, drive the beam in vibration.

Accordingly, it is a principal object of this invention to provide a digital indication of the pressure of a gas without the necessity of an analog to digitial converter apparatus.

It is another object of this invention to facilitate a digital indication of the pressure of a gas by apparatus which is simple, reliable, durable, and of relatively high accuracy.

Figure 2:
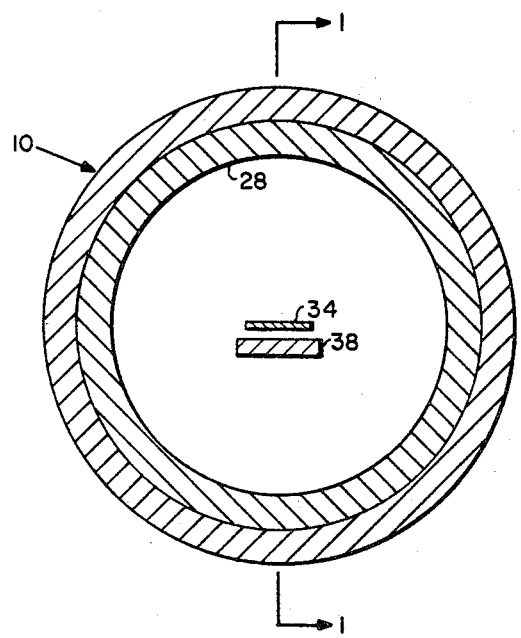
Figure 3:
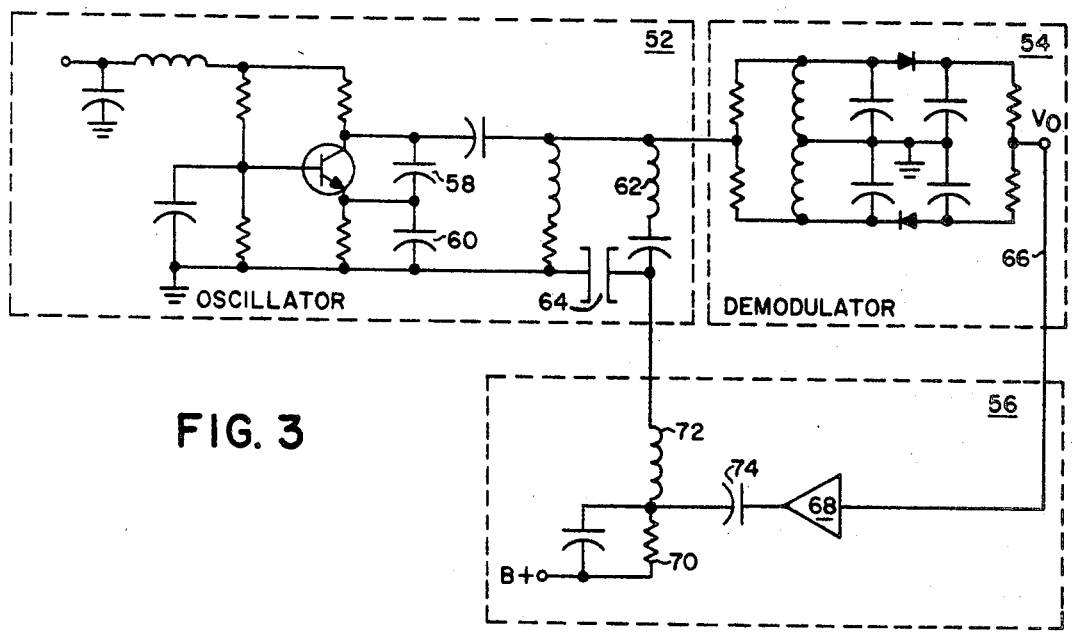
Figure 4:
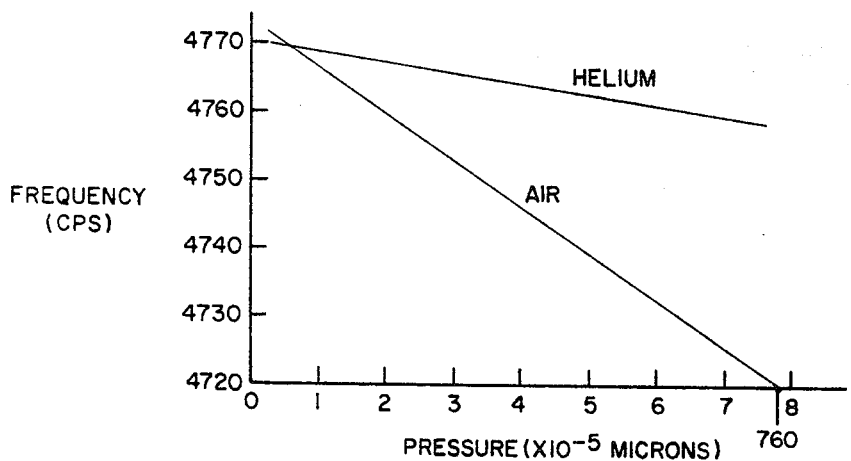

Other objects and many additional advantages will be more readily understood by those skilled in the art after a detailed consideration of the following specification taken with the accompanying drawings wherein:

FIGURE 1 is a front sectional elevation of a pressure transducer according to the present invention and taken along section 1—1 of FIGURE 2, FIGURE 2 is a side sectional elevation taken along sectional 2—2 of FIGURE 1, FIGURE 3 is a schematic diagram of an electronic circuit in which the transducer of FIGURES 1 and 2 forms a component, and FIGURE 4 is a graph showing the variation in frequency of the vibration of the beam in the pressure transducer of FIGURES 1 and 2 with variation in pressure within the transducer and for different gases.

Referring now more particularly to the drawings for a more detailed description of the invention, in FIGURES 1 and 2, 10 represents generally the entire pressure transducer according to the invention and including a cup-shaped enclosure 12 in the form of a right circular cylinder. Enclosure 12 is selectively closable at its open end by a cap 14 which may threadedly engage the enclosure 12. The cap 14 is provided with openings such as shown at 16 and 18 for introducing gas into the interior of the enclosure 12.

Within the enclosure 12 is supported a vibratory beam apparatus as shown generally at 20. Support for the beam apparatus 20 is provided at its respective ends by supports 22 and 24 including respective outer rings 22a and 24a, respective inner rings 22b and 24b and each pair of rings being attached to respective, flexible diaphragm portions 22c and 24c. The diaphragms 22c and 24c have respective openings 22d and 24d therein to provide communication between openings 16 and 18 and all parts of the interior of enclosure 12. The rings 22b and 24b have openings to hold the opposed ends of the vibratory beam structure 20 and the flexible diaphragms 22c and 24c maintain a rigid radial support for the beam while allowing a limited axial movement thereto whereby the member 20 is supported in an unstressed condition despite dimensional changes in housing 12 or beam 20 resulting from variations in ambient temperature. Outer ring 22a is axially supported by an annular shoulder 26 near the closed end of the enclosure 12 and is radially supported by the interior wall of the enclosure. Spacing between the supports 22 and 24 is maintained by a cylindrical sleeve 28 disposed within the enclosure 12 and in abutment with the facing ring portions 22a and 24a. A flange 30 inwardly directed from cap 14 is in abutment with the outer annular face of ring 24a for maintaining the entire assembly snugly fitted within the enclosure 12.

The vibratory transducer 20 includes an elongated member 32 preferably made of some metal such as nickel alloy. Of course, various other metals or low temperature coefficient of frequency materials would be suitable for the purpose with the requirement, however, that the surface thereof be conductive. At a portion intermediate the ends of the member 32, it is necked down or reduced in one dimension to form a thin vibratory beam 34 as shown in FIGURES 1 and 2 and preferably having a substantially flat planar surface. Co-operative with the beam 34 is a drive member 36 having a substantially flat planar surface 38 coextensive with the surface of beam 34 and relatively closely spaced therefrom. The drive member 36 is rigidly mounted to the member 32 and is insulated therefrom by insulators 40 and 42 preferably made of alumina or other suitable insulating material. The spacing between the portion 34 and the flat surface of the drive member 38 may be varied over a range; however, in any case, the spacing is necessarily less than the mean free path of the molecules of the gas, the pressure of which is to be measured and which occupies the space within the enclosure 12.

It is to be observed that the flat portion 34 of the vibratory member 20 and the flat portion of the drive member 36 form an electrical capacitor and that vibrations of the beam 34 in a direction transverse to the longitudinal axis of the member 20 is effective to vary the capacitance of such capacitor at the vibratory rate. The vibratory rate, however, is a function of the pressure of a gas occupying the space within the enclosure 12 and a function also of the density of such gas. Purely as an example, in one embodiment of a vibrating beam pressure transducer, the variation of the frequency of vibration of the beam 34 with the pressure of the gases helium and air was as illustrated in FIGURE 4 of the drawings. It is noted that the variation for either of these particular gases is linear, simplifying the determination of pressure of the gas by a knowledge of the frequency of the vibration of the beam 34.

For applying drive potentials to cause vibration of the beam 34, a pair of electrical leads 44 and 46 are provided and extended through the enclosure 12 and sleeve 28 for connection to the respectively vibratory member 20 and drive member 36. Suitable insulators 48 and 50 are provided to insulate these leads from the enclosure portion 12.

In a practical application of the vibrating beam pressure transducer shown in FIGURES 1 and 2 of the drawings, the beam portion 34 and the drive portion 38 form an electrical capacitor in a circuit shown in FIGURE 3 of the drawings. In this figure, the there main components of the circuit include an oscillator enclosed in a dotted rectangle 52, a demodulator circuit 54 and a beam drive circuit 56. The oscillator circuit 52 is shown as having a resonant tank circuit including capacitors 58 and 60, inductor 62 and capacitor 64 which comprises as its respective electrodes the beam 34 and drive member 38 of the transducer component. It should be understood that while the oscillator 52 is shown as having a resonant tank circuit, it may take any one of numerous other forms, such as oscillators of the resistance-capacitance phase shift type or of any type in which a capacitor forms a frequency determining element.

The oscillator 52 is operable at a relatively high carrier frequency, for example, of the order of 100 megacycles per second and the vibration of the capacitor plate 34 vibrating at a much lower frequency, is effective to alter the capacitance of the capacitor 64 in accordance with the spacing between the plates 34 and 38 and thus, to frequency modulate the oscillator 52. As noted hereinabove, the natural frequency of vibration of the element 34 is dependent among other things upon the pressure and density of the gases occupying the space between the beam 34 and member 38. Thus, the frequency modulation of the oscillator 52 is also dependent upon these factors.

The frequency modulated output of oscillator 52 is applied to the input of demodulator circuit 54, in which, in a well-known manner, the demodulator is effective to remove the carrier frequency of the oscillator and provide an output on a line 66 varying at a frequency equal to the frequency of vibration of the beam 34. This demodulated signal is applied to the beam drive circuit 56 wherein it is amplified by the amplifier 68 which may include a suitable phase shifting circuit to adjust the phase of the signal. A direct potential is applied across the plates of capacitor 64 from a source designated B+ and applied through a resistor 70 and radio frequency choke 72. The alternating frequency output potential from amplifier 68 is superimposed on such direct potential by the application thereof through a capacitor 74 to the junction between resistor 70 and inductor 72.

In accordance with a well-known phenomenon, the varying direct potential so formed and applied in this manner, is effective to produce forces between the plates of capacitor 64 so as to drive the beam 34 at the vibration frequency of the potential derived from the output of amplifier 68. The feedback circuit thus described compensates for the energy loss in the beam 34 in its vibration. The bandwidth electronic circuitry in FIGURE 3 of the drawings is at least as wide as the vibrating range of the beam 34 and thus, is effective to provide drive for the beam under any conditions of its operation.

The output $V_0$ from the demodulator circuit 54 is adaptable for application to any digital apparatus such as a frequency measuring device for determining the pressure of the gas within the interior of enclosure 12. It is clear that such a pressure measuring apparatus will necessarily require an appropriate calibration as may be derived from the information contained in FIGURE 4 of the drawings.

It is clear that numerous other forms of complementary surfaces, one of which is vibratory, and which are co-operative with a gas tight enclosure whereby the frequency of vibration of one surface is a function of the pressure and density of the gas, may be provided without departing from the spirit and scope of this invention. Accordingly, it is within the contemplation and purview of this invention to cover such other forms in the appended claims.

While the present invention has been described in a preferred embodiment, it will be obvious to those skilled in the art that the various modifications can be made therein within the scope of the invention, and it is intended that the appended claims cover all such modifications.

What is claimed is:

1. A pressure transducer apparatus comprising a hermetically sealed enclosure having an opening for introducing a gas to the interior thereof, an elongated member within said enclosure and having a substantially flat portion forming a vibratory beam, means for supporting said elongated member and for maintaining said beam substantially stress-free along an axial direction thereof, a second member having a substantially flat portion coextensive with the flat portion of said beam and being rigidly supported in spaced relationship with respect to said beam by said elongated member and means associated with said enclosure for vibrating said unstressed beam, the space between said flat portions being in communication with said opening whereby vibrations of said beam in a direction transverse to its flat surface vary as a function of the density and pressure of gas in the space between said flat surfaces.

2. A pressure transducer according to claim 1 wherein said means for vibrating said beam includes means coupled to said vibratory beam for driving the same at its natural frequency of vibration.

3. A pressure transducer according to claim 1 wherein the spacing between said flat surface portions is less than the mean free path of the gas molecules occupying the interior of said enclosure.

4. A pressure transducer according to claim 1 additionally comprising conductive surface portions on each of said flat surfaces wherein said second member forms with said first member an electrical capacitor, electrical circuit means for deriving a signal varying at a frequency equal to the vibration frequency of said beam and wherein said means for vibrating said beam comprises means responsive to said deriving means for applying across said members a direct potential varying at the frequency of vibration of said beam for driving said beam and maintaining vibration thereof.

5. A pressure transducer according to claim 4 additionally comprising an electronic oscillator, said electrical capacitor formed by said members being in the frequency determining circuit of said oscillator whereby the vibrations of said beam are effective to frequency modulate the said oscillator at the beam vibration rate, a frequency demodulator circuit responsive to the output of said oscillator to derive an output potential varying at the beam vibration rate, and means for superimposing the output potential of said demodulator on said direct potential applied across said members and in a phase to maintain vibration of said beam.

6. A pressure transducer according to claim 4 wherein said conductive portion is intermediate to the ends of said elongated member and wherein said support means for maintaining said beam substantially stress-free along an axial direction thereof includes a pair of flexible members respectively coupling each end of said elongated member to said enclosure.

7. A pressure transducer apparatus comprising a hermetically sealed enclosure having an opening for introducing a gas to the interior thereof, an elongated member within said enclosure and having a substantially flat portion forming a vibratory beam, means for driving said vibratory beam, and means supporting said elongated member to prevent stressing thereof along its longitudinal axis.

References Cited
UNITED STATES PATENTS

| | | | |
|---|---|---|---|
| 3,257,850 | 6/1966 | Kooiman | 73—398 |
| 3,295,360 | 1/1967 | Dimeff | 73—398 XR |

S. CLEMENT SWISHER, *Acting Primary Examiner.*

DONALD O. WOODIEL, *Assistant Examiner.*